Sept. 3, 1963  A. J. SLEMMONS  3,102,521
COMBUSTION APPARATUS FOR AN INTERNAL COMBUSTION ENGINE
Filed Dec. 20, 1960  3 Sheets-Sheet 1
FIG_1
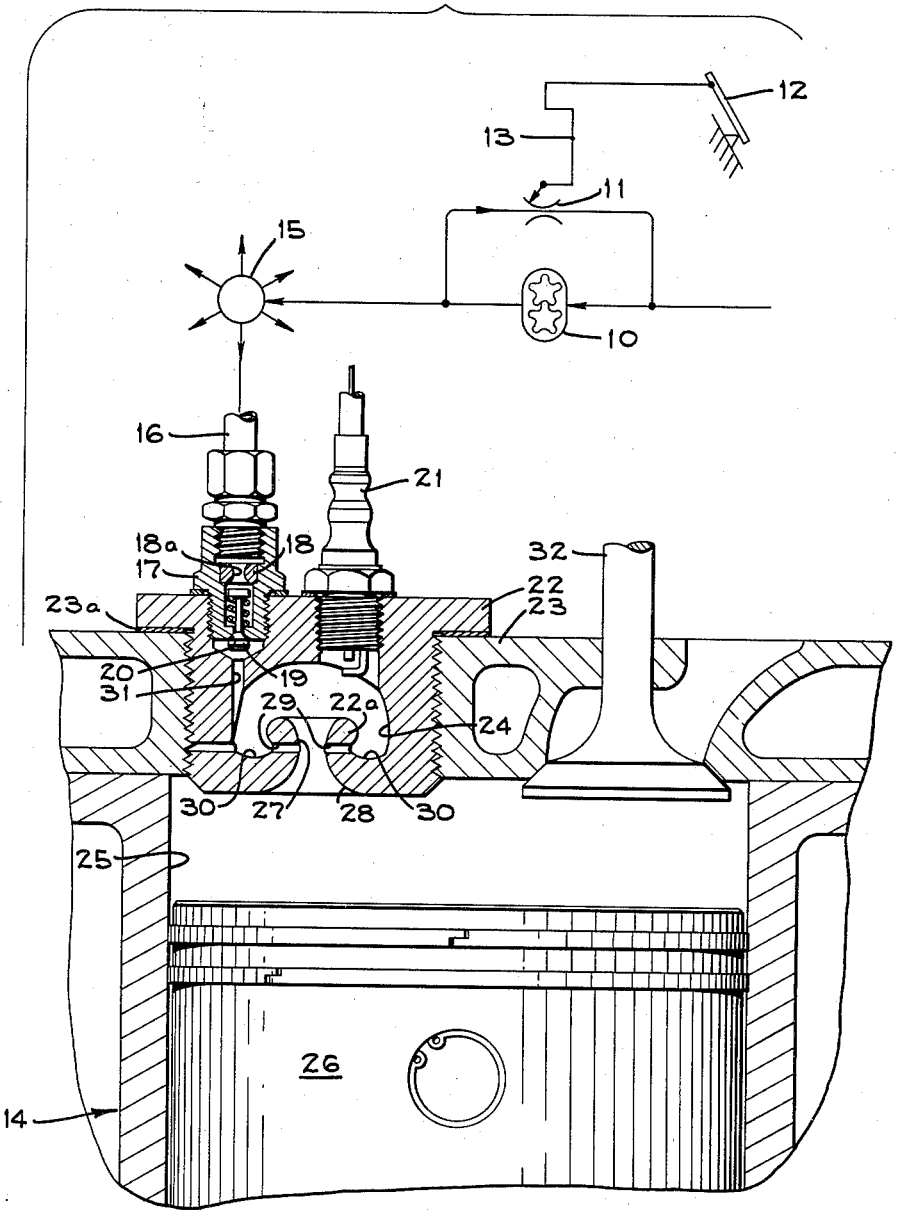
INVENTOR
ARTHUR J. SLEMMONS
BY
ATTORNEY

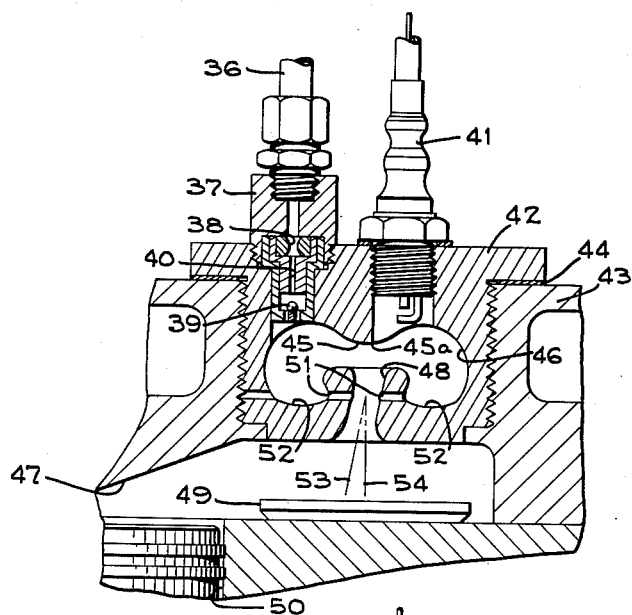
FIG_2
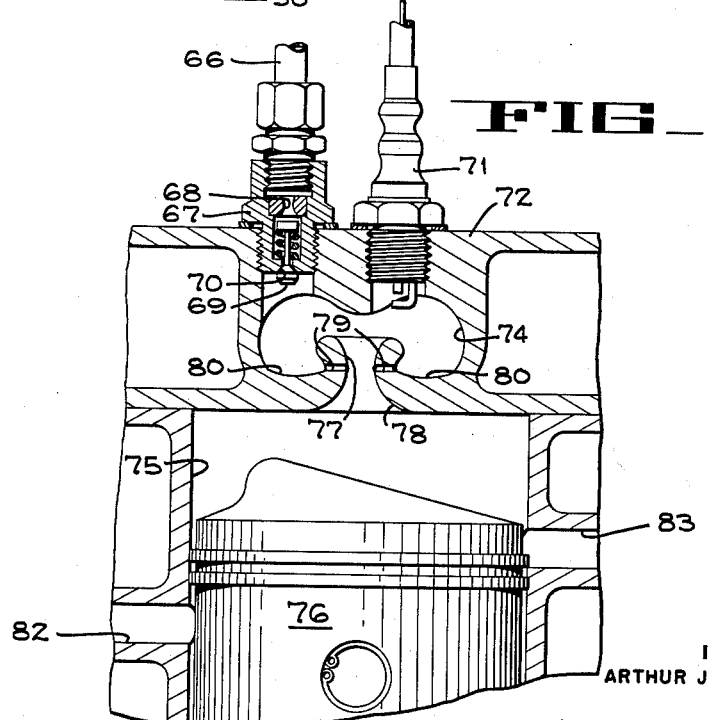
FIG_3

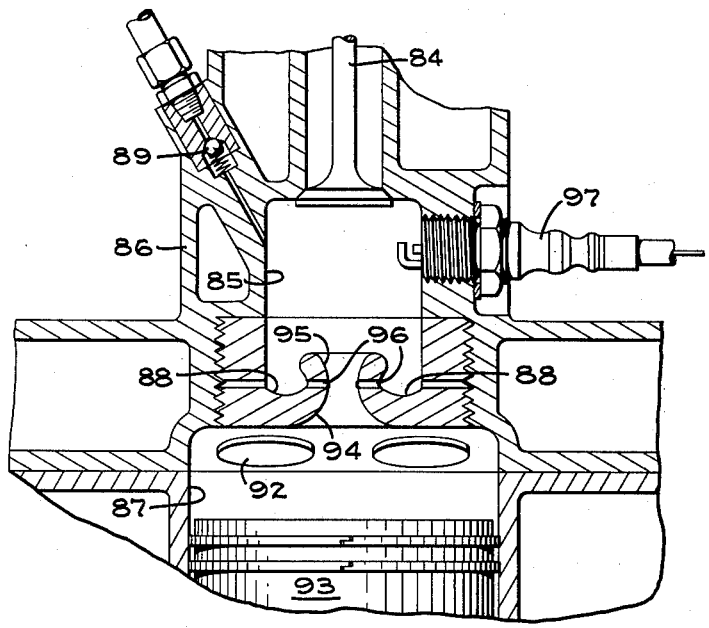
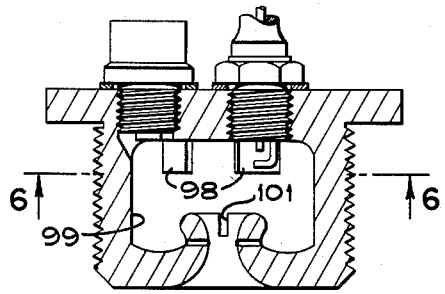
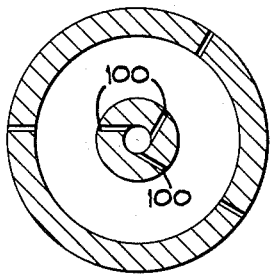
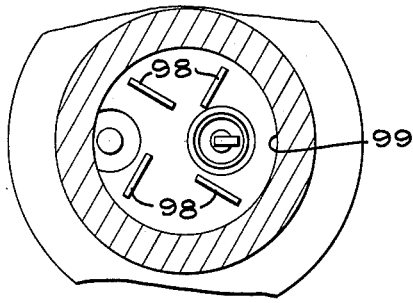

United States Patent Office 3,102,521
Patented Sept. 3, 1963

3,102,521
COMBUSTION APPARATUS FOR AN INTERNAL COMBUSTION ENGINE
Arthur J. Slemmons, Los Gatos, Calif., assignor to FMC Corporation, a corporation of Delaware
Filed Dec. 20, 1960, Ser. No. 77,227
13 Claims. (Cl. 123—32)

This invention relates to combustion apparatus for an internal combustion engine, and more particularly to precombustion chambers for engines of the spark ignition type.

In the conventional type of diesel engine, fuel is injected under high pressure into the combustion chamber and compressed by the piston until the heat of compression causes the fuel to ignite and drive the piston downwardly in the power stroke. Such engines require heavy construction to withstand the high pressures. Pumps or compressing means are required for the fuel injection which must be precisely timed with the movement of the piston. Such construction has disadvantages with relation to weight and first cost, but in operation the diesel engine is relatively efficient due to fuel economy. The spark ignition engine operates at lower pressure and therefore permits smaller, lighter and more economical construction, but does not achieve the diesel engine efficiency because of the problem of igniting a lean fuel mixture and the problem caused by the variable rate of fuel burning at various engine loads and speeds.

It is an object of the present invention to provide an internal combustion engine which achieves diesel engine fuel economy without sacrificing the advantages of the lower compression automotive type engines.

Another object of the present invention is to provide an internal combustion engine of the spark ignition type with an improved precombustion chamber in which fuel is vaporized and atomized.

A further object of the present invention is to provide an internal combustion engine which utilizes the Bernoulli effect for mixing the fuel with a charge of fresh air and moving the mixture into the combustion chamber.

Other objects and advantages of the invention will become apparent from the following detailed description, reference being made to the annexed drawings, in which:

FIG. 1 is a fragmentary view of the engine of the present invention with the improved precombustion chamber shown in section and the fuel feed system shown diagrammatically.

FIG. 2 is a fragmentary medial section of a second embodiment of the cylinder head of the present invention.

FIG. 3 is a fragmentary medial section of a third embodiment of the cylinder head of this invention, having a precombustion chamber adapted for a two cycle engine.

FIG. 4 is a fragmentary medial section of a fourth embodiment of the present cylinder head.

FIG. 5 is a fragmentary medial section of another embodiment of a precombustion chamber embodying the invention and having vanes projecting into the precombustion chamber.

FIG. 6 is a fragmentary section taken on the line 6—6 of FIGURE 5.

FIG. 7 is a section of another embodiment of a precombustion chamber, said section being taken in the plane of the transversely extending passageways, and particularly showing the passageways extending tangentially from the throat portion of the chamber.

Referring to FIGURE 1, a fuel pump 10 supplies fuel for the engine through a pressure regulator 11 which in turn is controlled by a throttle control member, such as a pedal 12, through a linkage 13. The fuel is distributed by a conventional rotary distributor 15 which feeds the fuel lines leading to all the cylinders of the engine and particularly line 16 leading to cylinder 14. Fuel flows from line 16 at a relative low pressure into a check valve fitting 17 which contains a flow metering orifice plate 18. The metering orifice plate 18 preferably is a watch makers jewel which has been drilled to provide an orifice 18a of predetermined size. A spring loaded check valve 19 normally closes the port 20 at the lower end of the check valve fitting 17.

The check valve fitting 17 and a conventional spark plug 21 are positioned side by side in a precombustion chamber body 22 which is screwed into the head 23 of the engine, and a suitable gasket 23a is provided to form a seal between the body 22 and the head. The inner walls of the precombustion chamber body define a substantially hemispherical precombustion chamber 24. The chamber 24 communicates with the main combustion chamber 25 above the piston 26 of the engine through a throat section 27 and an open mouth 28 formed in a central portion 22a of the body 22. The throat section 27 contains a number of small diameter lateral passageways 29 which extend from the throat section 27. An annular fuel-containing reservoir 30, which extends around the central portion 22a, has a cupped-out or concave bottom adapted to hold a small volume of fuel. Fuel enters the reservoir 30 through line 16, the metering orifices 18, the port 20, and a passageway 31 in the body 22.

During the intake stroke, the piston moves downwardly, the valve 19 opens, and liquid fuel runs into the annular cupped-out region of the reservoir 30. When the piston moves upward during the compression stroke, the pressure in the main compression chamber 25 is higher than the pressure of the gas in the precombustion chamber 24. Under these conditions, some of the fresh charge of air received from the standard intake valve 32 during the intake stroke is forced through throat 27 into the precombustion chamber 24 and draws fuel out through the passageways 29 to atomize the fuel and carry it upward into the precombustion chamber 24.

The toroidal shape of the precombustion chamber causes a violent toroidal vortex within the precombustion chamber during the compression stroke. This toroidal vortex will consist of a high speed turbulent rotating "smoke ring" of fuel and air. The scrubbing of the walls by this toroidal vortex, together with the heat of the walls, will tend to vaporize the fuel within the precombustion chamber.

As the piston approaches top dead center, the spark plug 21 fires, igniting the fuel-air mixture in the precombustion chamber 24. This mixture, of course, explodes and the burning gases quickly move out of precombustion chamber 24 through the throat 27. The high velocity of the gas passing through the throat section 27 in the downward direction, draws the remainder of the fuel from the reservoir 30 through passageways 29 into the main combustion chamber 25. The fuel is sheared off into small droplets by the out-rushing gases, and it arrives in the main combustion chamber 25 as a burning atomized mist. The fuel particles sheared off by the gases moving through the throat 27 are as small as the fuel particles used in high compression, atomized, fuel ignition systems. However, the size is amenable to relatively slow burning rates, and the size of the fuel particles in the burning mist is sufficiently small so that each of the particles is completely burned, and power is smoothly applied to the top of the piston.

In FIG. 2 another form of the cylinder head of the invention is illustrated. Fuel flows from a fuel line 36 at a relatively low pressure into a check valve fitting 37 which contains a flow metering orifice 38. A ball check valve 39 is provided to close a port 40 within the check valve fitting 37. The check valve fitting 37 together with a conventional spark plug 41 are positioned side by side in a precombustion chamber body 42, said body 42 being fitted by means of screw threads into a cylinder head 43 of the internal combustion engine. A suitable gasket 44 is provided between head 43 and the body 42. The precombustion chamber body includes a downwardly projecting guide member 45a in a central upper wall 45 and a toroidal or ring-shaped precombustion chamber 46 disposed around the guide member 45. The chamber 46 communicates with the main combustion chamber 47 through throat section 48. The center line 53 of the throat section 48 is inclined with respect to the center line 54 of precombustion chamber 46. An intake valve 49, which is spaced laterally from the cylinder 50, is disposed directly below the throat 48. This arrangement causes the air rushing in during the intake stroke to be directed to one side of the chamber 46 and to swirl around the walls of said chamber 46, and the positioning of the intake valve 49 beneath the throat section 48 of the precombustion chamber also tends to counteract the blow torch effect of burning vapor emanating from said chamber 46. The throat section 48 is of a hyperboloid shape and contains a number of small diameter lateral passageways 51, which lead from the throat section 48 and open above an annular fuel containing reservoir 52. The bottom of said reservoir 50 is cupped out so as to hold a small volume of liquid fuel. The operation of the internal combustion engine shown in FIGURE 2 is similar to the operation described in connection with the cylinder head of FIGURE 1.

The embodiment illustrated in FIG. 3 features an improved precombustion chamber adapted for use in a two cycle engine. Fuel is directed to a reservoir 80 by means of a fuel line 66, a metering orifice 68 in a check valve fitting 67, and a spring loaded check valve 69 which normally closes port 70. The check valve fitting 67 and a spark plug 71 are positioned side by side in a precombustion chamber body 72 which is an integral part of the cylinder head. The inner walls of the precombustion chamber body define a toroidal or ring-shaped precombustion chamber 74 which communicates with a main combustion chamber 75 through a throat section 77. The throat section 77 is of a hyperboloid shape and contains a number of small diameter, lateral passageways 79 which lead through the throat section 77 and open above the annular fuel containing reservoir 80. The bottom of said reservoir 80 is cupped out so as to hold a small volume of liquid fuel. Air enters the cylinder through intake port 82 and, as the piston 76 moves upward, the air is forced up through an open mouth 78 and the throat section 77 into the precombustion chamber 74. As this surge of air flows through the narrow throat section 77, fuel is drawn through the passageways 79 and tends to atomize with the air entering the precombustion chamber. The fuel is ignited by the spark plug 71, and the burning mixture flows out of the precombustion chamber through the throat section 77 and open mouth 78 into the main combustion chamber 75. As the fuel flows out through the throat section 77, additional fuel is drawn through the passageways 79. The pressure of the rapidly burning fuel drives the piston down until it passes an exhaust port 83. The piston continues downwardly to the end of its stroke under the influence of expanding gases until intake port 82 is uncovered.

A fourth embodiment of the combustion apparatus of the present invention is illustrated in FIGURE 4 wherein an auxiliary intake valve 84 is positioned at one end of a precombustion chamber 85 formed in a cylinder head 86. Fuel is supplied to an annular reservoir 88 through check valve 89. When scavenging valve 84 opens, a charge of air blows through the precombustion chamber 85, through a throat section 95 and into the cylinder 87, forcing the exhaust gases into the main combustion chamber 87. This movement of gas through throat section 95, draws fuel from reservoir 88 and carries it into main combustion chamber 87. Fresh air also enters through a main intake valve 92, and the piston 93 moves up, forcing the air through open mouth 94 and restricted throat 95. Fuel is drawn into the jet stream from the annular reservoir 88 through lateral passageways 96, thereby atomizing with the air. The piston continues its upward movement until top dead center is reached, then a spark plug 97 ignites the fuel vapor causing it to expand and drive the piston downward again. The rush of air through throat 95 causes fuel to be drawn into the jet stream and carried into the main combustion chamber, driving the piston 93 downward and the cycle is repeated.

The embodiment of the invention illustrated in FIG. 5 features a plurality of vanes 98 projecting from the top portion of the cylinder head into the precombustion chamber 99. These vanes are disposed in planes normal to each other, as shown in FIG. 6, and are effective to cause turbulence of the fuel vapor gas within the precombustion chamber, thereby furthering the atomizing of the fuel and the air and the rotation of the fuel-air "smoke ring" within the precombustion chamber. Also, notches 101 are located in the throat section of the precombustion chamber for the same purpose.

FIGURE 7 illustrates a further modification of the invention. The laterally extending passageways 100 extend tangentially from the throat portion instead of being on radial lines.

In spark ignition engines, the vaporization within the precombustion chamber must be sufficient to allow positive spark at all speeds and fuel flows. Some precombustion chambers have depended mainly upon manifold heating of the fuel to provide vaporization prior to ignition. Other precombustion chambers have utilized the above discussed small restrictions for atomizing fuel and producing turbulence. In the first case, heating produces satisfactory vaporization during low speed operations, but the time interval required for proper vaporization is often too short during high speed operations. Also, available heat is not usually adequate when attempting to start this type of engine with low volatility fuels. In the second case, the small restrictions required for atomization and turbulence during low speed operations excessively restrict fuel flow during high speed operations. In the proposed precombustion chamber, both principles are utilized at all speeds. During all speeds of operation, the heat of the precombustion chamber walls will assist the vaporization of the fuel and provide a combustible mixture. During all speeds the high velocity through the throat will draw off and atomize fuel droplets due to the Bernoulli effect. The large throat will not choke during the high speed operation and the Bernoulli effect will provide atomization for all fuel rates without resorting to restrictive orifices through which all the fuel and air charge must pass. During all speeds, both the heating and shearing effect will cause atomization of the fuel, although one may be more predominate than the other at a particular speed range. These effects will provide good engine starting characteristics with low volatility fuels.

The atomization of the fuel remaining in liquid form after the firing of the spark is just as important as the atomization and vaporization of the fuel during the compression stroke. The precombustion chamber's ability to atomize fuel when handling both large and small fuel flows without choking during high fuel flows, and without dribbling during low fuel flows, is one of the significant features of this invention. This feature, of course, permits the engine to be operated economically on low grade fuels both at idle speeds and at speeds where the engine is producing its maximum.

While particular embodiments of the present invention have been shown and described, it will be understood that the atomized precombustion chamber is capable of modification and variation without departing from the principles of the invention and that the scope of the invention should be limited only by the scope and proper interpretation of the claims appended hereto.

Having thus described the invention what is believed to be new and desired to be protected by Letters Patent is:

1. In an internal combustion engine, a cylinder having a combustion chamber, a cylinder head having a precombustion chamber, means defining a throat section establishing communication between said combustion chambers, an annular fuel reservoir in said pre-combustion chamber, and means providing a lateral passageway extending from said fuel reservoir tangentially to the circumference of said throat section so that the flow of gases through said throat section will draw fuel into said throat section to mix with the flowing gases in said section.

2. An internal combustion engine comprising a cylinder, a slidable piston in said cylinder, a cylinder head mounted on said cylinder, means defining a pre-combustion chamber in said head having a throat section of circular cross-section in flow communication with said cylinder, fuel injection means disposed in said pre-combustion chamber, ignition means disposed in said pre-combustion chamber, said head having an annular wall projecting into said pre-combustion chamber and extending upwardly into said pre-combustion chamber around said throat section, a fuel reservoir adjacent the exterior of said annular wall, said annular wall having at least one passage extending between said reservoir and said throat section, said passage being disposed tangent to said circular throat section, whereby when said piston is moved in said cylinder air will pass rapidly through said throat section causing fuel to be drawn from said reservoir through said tangential passage into said throat section and then into said pre-combustion chamber.

3. In an internal combustion engine, cylinder, a piston disposed in said cylinder and cooperating therewith to define a main combustion chamber, a cylinder head having a pre-combustion chamber, means defining a passageway between said chambers, and a fuel reservoir in said precombustion chamber adjacent said passageway, said pre-combustion chamber having a generally fragmentary spherical dome opposite said passageway whereby gases rushing through said passageway incident to movement of said piston in said cylinder will draw fuel from said reservoir and direct it against said dome to be redirected in turbulent flow through said precombustion chamber.

4. In an engine including a cylinder, a cylinder head connected to said cylinder and defining a main combustion chamber with said cylinder, and a piston reciprocably movable in said chamber toward and away from said head; a precombustion apparatus comprising a body mounted in said head and having a bottom wall facing said combustion chamber, an internal side wall projecting from said bottom wall away from said main combustion chamber, a top wall joined to said side wall and being opposite to said bottom wall, said bottom, side and top walls defining a precombustion chamber, an annular wall projecting from said bottom wall into said precombustion chamber, said annular wall being in circumferentially spaced relation to said side wall and being spaced from said top wall, said annular wall circumscribing a throat having a central portion of minimum cross sectional area and opposite end portions of cross sectional area greater than said central portion, said end portions respectively opening into said chambers, said bottom wall and the portions of said side and annular walls adjacent to said bottom wall being imperforate thereby providing an annular fuel reservoir circumscribing said annular wall, and said annular wall having a passageway opening into said reservoir above said imperforate portions of said annular wall and opening into said central portion of the throat whereby upon reciprocation of said piston, high velocity gas rushes through said throat into and out of said chambers and draws fuel through said passageway and into said throat for mixture with said gas.

5. The precombustion apparatus of claim 4 wherein said passageway is in a plane substantially normal to the axis of said throat.

6. The precombustion apparatus of claim 4 wherein said body has a fuel inlet opening into said precombustion chamber over said reservoir and displaced laterally of said throat.

7. The precombustion apparatus of claim 4 wherein said precombustion chamber defined by said side, annular, and bottom walls is substantially toroidally-shaped whereby a toroidal vortex of swirling gas is created in said precombustion chamber during reciprocation of said piston.

8. The precombustion apparatus of claim 4 wherein said throat is angled toward one side of said precombustion chamber so that gas rushing into said precombustion chamber is directed toward said side thereof in order to promote swirling of said gas in said precombustion chamber.

9. The precombustion apparatus of claim 8 wherein said cylinder provides an intake facing said throat.

10. The precombination apparatus of claim 4 wherein said cylinder head provides an intake communicating directly with said precombustion chamber on the opposite side of said throat from said main chamber, said intake, throat, and main chamber being in axial alignment.

11. The precombustion apparatus of claim 4 wherein said top wall has a central portion projecting downward toward and in alignment with said throat.

12. The precombustion apparatus in claim 4 including a vane projecting from said top wall into said precombustion chamber for causing turbulence of gas in said precombustion chamber.

13. The precombustion apparatus of claim 4 wherein said annular wall has a notch opening into said precombustion chamber for causing turbulence of gas within said precombustion chamber.

References Cited in the file of this patent

UNITED STATES PATENTS

| | | |
|---|---|---|
| 1,329,797 | Raabe | Feb. 3, 1920 |
| 1,414,384 | Tartrais | May 2, 1922 |
| 1,525,776 | French | Feb. 10, 1925 |
| 1,594,774 | French | Aug. 3, 1926 |
| 1,907,095 | Adams | May 2, 1933 |
| 2,019,298 | Fisher | Oct. 29, 1935 |
| 2,153,598 | Steward | Apr. 11, 1939 |

FOREIGN PATENTS

| | | |
|---|---|---|
| 1,044,470 | France | June 17, 1953 |